United States Patent

Heinle et al.

[11] Patent Number: 4,750,671
[45] Date of Patent: Jun. 14, 1988

[54] REGULATING DEVICE OF A MULTI-CHANNEL HEATING SYSTEM FOR A VEHICLE

[75] Inventors: Dieter Heinle, Plüderhausen; Wolfgang Volz, Magstadt, both of Fed. Rep. of Germany

[73] Assignee: Daimler-Benz Aktiengesellschaft, Stuttgart, Fed. Rep. of Germany

[21] Appl. No.: 106,448

[22] Filed: Oct. 9, 1987

[30] Foreign Application Priority Data

Oct. 14, 1986 [DE] Fed. Rep. of Germany ....... 3634908

[51] Int. Cl.⁴ .......................................... G05D 23/00
[52] U.S. Cl. ............................. 237/2 A; 237/12.3 A; 237/12.3 B
[58] Field of Search ............. 237/2 A, 12.3 B, 12.3 A; 165/40, 34, 41; 236/91 F, 10

[56] References Cited

U.S. PATENT DOCUMENTS 4,417,688 11/1983 Schnaibel et al. ................. 237/2 A

FOREIGN PATENT DOCUMENTS 2849275 11/1978 Fed. Rep. of Germany .

Primary Examiner—Henry A. Bennet
Attorney, Agent, or Firm—Barnes & Thornburg

[57] ABSTRACT

A regulating device of a heating system having a divided heat exchanger is provided in which the duration of opening of the throttle valves is determined in dependence of the number of throttle valves simultaneously opened and in accordance with the heat requirement. As a result, temperature fluctuations are avoided when different heat requirements exist.

4 Claims, 2 Drawing Sheets

REGULATING DEVICE OF A MULTI-CHANNEL HEATING SYSTEM FOR A VEHICLE

BACKGROUND AND SUMMARY OF THE INVENTION

The present invention relates to a regulating device for a multi-channel cycle-controlled heating system of a motor vehicle. This system has a heat exchanger which is divided into partial heat exchangers for heating different cabin areas and is equipped with a common inlet opening for heating medium, with a throttle valve arranged at an outlet opening of each of the partial heat exchangers.

Two-channel heating systems for individual regulation of the air outlet temperature on the driver and passenger sides in motor vehicles are generally known. Such regulation is achieved by a water/air heat exchanger which is divided into two and in which different water flows and thus different air outlet temperatures are achieved by two throttle valves which are actuatable independently of one another. The throttle valves are opened for more or less time during one fixed cycle period, depending on the heat requirement.

If both throttle valves are opened at the same time, approximately equal volumes flow through both parts of the heat exchanger. If one throttle valve closes earlier with a different heat requirement, twice the volume of water per units of time flows through the section of the heat exchanger associated with the throttle valve which is still open. This leads to increased availability of heat and thus to an increase in the air outlet temperature. This increase is compensated again with a certain delay via temperature sensors but can lead to periodic fluctuations of the air outlet temperatures if the conditions are unfavorable.

For this reason, an object of the present invention is to provide an improved regulating device so that the air outlet temperatures associated with one side do not change, or only insignificantly so, when there is a change in the air outlet temperatures associated with the other side, and that during this process periodical temperature fluctuations are avoided.

This and other objects are achieved in the present invention by providing a regulating device of a heating system having a divided heat exchanger with setpoint generator means associated with the throttle valves for setting a duration of a cycle period of opening of each throttle valve according to a position of the setpoint generator means. The setpoint generator means includes control means for controlling the position of the setpoint generator means, such that the duration of opening of one of the throttle valves causes a partial quantity of the heating medium to flow through the partial heat exchanger in dependence on the duration of opening of all the other throttle valves simultaneously opened.

In a two-channel heating system, that is to say with a heat exchanger which is divided into two, the opening time is accordingly multiplied by a factor of 1 when both throttle valves are opened. For the second valve which is still open after one valve has been closed, the residual duration of opening is multiplied by a factor which can be about 0.5 and is thus shortened in such a manner that there is no noticeable increase in air outlet temperature on this side despite the higher water flow rate, using the cycle period as a basis.

A cycle period duration of about 5 seconds is a compromise since temperature fluctuations occur during a relatively long cycle period, particularly if there is a low heat requirement, and the life of the throttle valves is reduced with a shorter cycle period. In consequence, alternating pulsing of the throttle valves in successive cycle periods without different time weighting of the durations of opening of the valves is less well suited for solving the problems since then, of necessity, a gap in opening of at least one cycle period, but in most cases more, occurs which becomes noticeable in temperature fluctuations. A further division of a heat exchanger is contemplated in which, in addition to the subdivision into driver/passenger side, for example a subdivision into front/rear is undertaken.

Other objects, advantages and novel features of the present invention will become apparent from the following detailed description of the invention when considered in conjunction with the accompanying drawings.

DETAILED DESCRIPTION OF THE DRAWINGS

Figure 1:
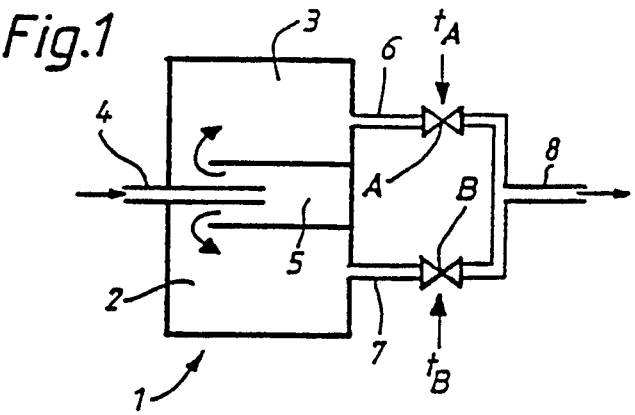
FIG. 1 is a schematic depiction of a heat exchanger divided into two.

In FIG. 1, a heat exchanger 1, known per se, is diagrammatically represented and is divided into two parts 2, 3. The water, heated by the engine and indicated in its direction of flow by arrows, coming from the engine, flows through a line 4 into a distributor chamber 5 and, from there, into the two parts 2 and 3 of the heat exchanger 1. From the two parts of the heat exchanger, the cooled water flows via lines 6 and 7, which can be opened and closed via one electro-magnetic valve A and B each, to a common return line 8 which conducts the water back to the engine. The heating water is pumped through the heat exchanger by a water pump, not shown, at least when the heating system is switched on and at least one of the two valves A, B is opened.

The regulating device, or setpoint generator, for the heating system is controlled by a microprocessor and, in consequence, operates to digitally control the two valves A and B. These valves A, B are controlled in accordance with the setting of the heating system and the heat requirement such that the valves A, B open within successive cycle periods T and close again after a particular time $t_A$ and $t_B$, respectively, in accordance with the heat requirement.

Figure 2:
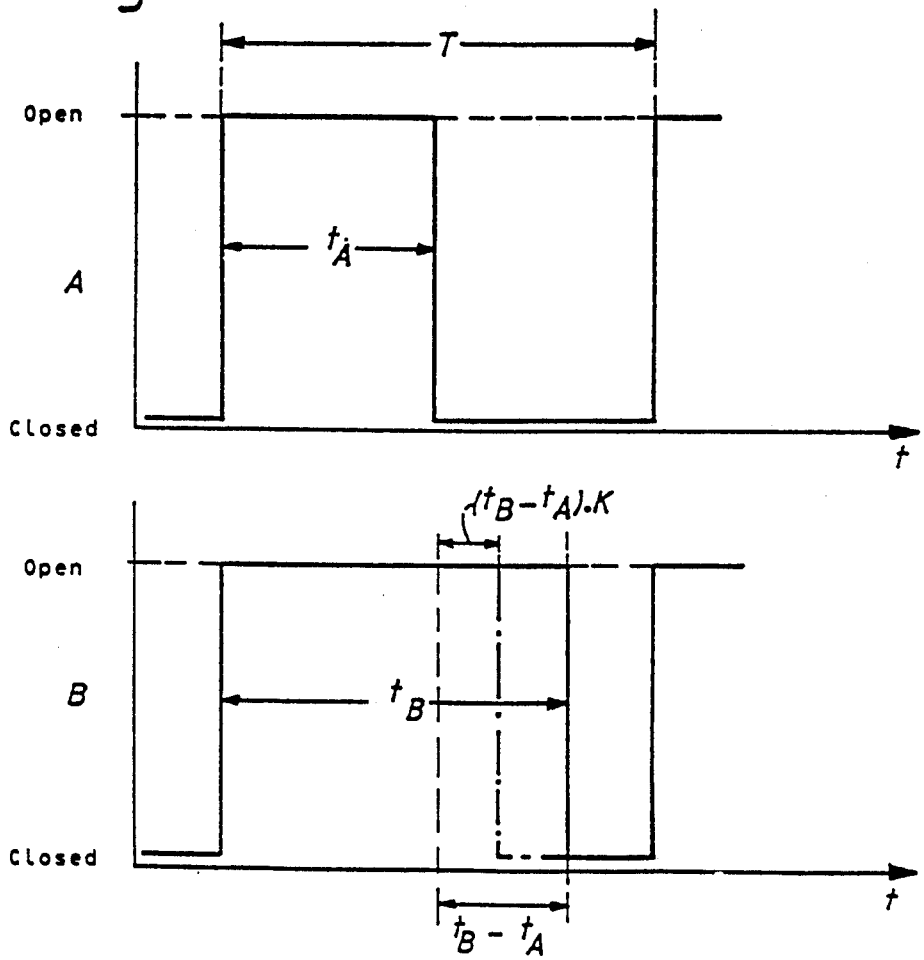
FIG. 2 is a diagram of the cycle periods and durations of opening of the throttle valves of FIG. 1.

The variation of the actuating signals for the two valves A and B is shown in FIG. 2. It is here assumed that, for example, the heat exchanger part 3 with a valve A is allocated to the driver's side and the heat exchanger part 2 with valve B is allocated to the passenger's side of the heating system. If both valves A and B are opened for the same length of time, approximately the same quantity of hot water flows through each of the two heat exchangers parts 2, 3, assuming a symmetrical construction of the heat exchanger 1, so that the outlet temperatures of the air, which heats up on the heat exchanger, will be about the same on the driver's side and the passenger's side. If then, for example on the driver's side, the setting is changed in the direction of a lower temperature, actuating signals for valves A and B are obtained, the variation with time of which corresponds to the representation in FIG. 2.

Within cycle period T, the actuating signals of both valves A, B begin at the same time. Valve A is opened for duration $t_A$, and valve B for duration $t_B$. Starting from the time at which valve A closes, the total hot water stream, which was previously distributed to both heat exchanger parts, flows with increased flowrate through heat exchanger part 2 so that the temperature in the latter would increase beyond the required measure if valve B were to remain open over the entire duration $t_B$.

For this reason, duration $t_B-t_A$, during which valve B alone is opened, is multiplied by a factor which is smaller than 1 and the valve is correspondingly prematurely closed after the total time $t_A+(t_B-t_A).k$, before time $t_B$ has elapsed, which is shown by a dot dashed line in FIG. 2. An excessive increase in the air outlet temperature on the passenger's side is largely avoided in this manner. The factor k is approximately 0.5, in certain preferred embodiments, although other approximate values less than 1 are contemplated.

Figure 3:
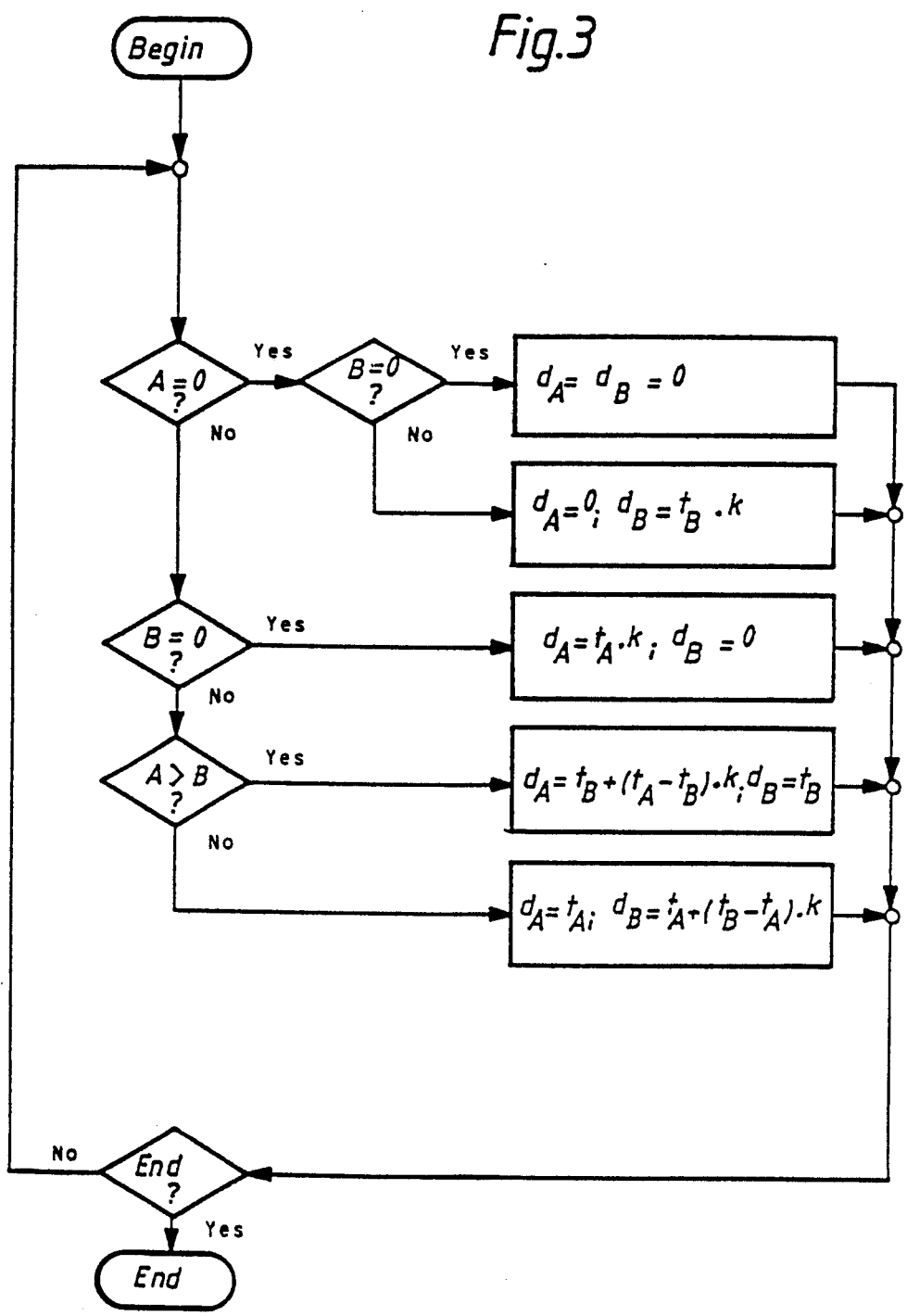
FIG. 3 is a flowchart for the progress of regulation of one cycle period.

FIG. 3 shows a flowchart which represents a possible progress of a cycle period. The microprocessor regulating the entire heating system can handle the determination of the durations of opening of the valves and control of the valves.

Interrogation of the heat requirements and determination of the valve opening times for one cycle period is best effected during the preceding cycle period. For the sake of simplicity, the heat requirement is equated with the relation of the associated valve:

A . . . for the driver's side and B . . . for the passenger's side.

A=O,B=O means: no heat requirement, valve closed.
A>B means: heat requirement greater on the driver's side than on the passenger's side.

The durations (designated by $d_A$, $d_B$ in this diagram) of the valve openings are determined in accordance with the result of these interrogations, as entered in the flowchart, and implemented in the subsequent cycle period by means of appropriate actuating signals.

In certain preferred embodiments, the duration of opening is changed in dependence on the cabin temperature or the air outlet temperature of the heating system. In some of these preferred embodiments, the duration of the opening is changed depending on the difference between the actual value and the setpoint of the cabin or air outlet temperature.

Since, among other things, the heat exchanger and other elements of the heating system exhibit a nonlinear behavior, provision has been made in contemplated embodiments for representing factor K, if necessary, not as a constant but itself as a function of temperatures or temperature differences. Corresponding relationships are containable in the microprocessor or in its memory, respectively.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A regulating device for a multi-channel cycle-controlled heating system of a motor vehicle, said system having a heat exchanger which is divided into partial heat exchangers for heating different cabin areas and is equipped with a common inlet opening for heating medium and with a throttle valve arranged at an outlet opening of each said partial heat exchanger, said regulating device comprising:

setpoint generator means associated with said throttle valves for setting a duration of a cycle period of opening of each said throttle valve according to a position of said setpoint generator means;

wherein said setpoint generator means includes control means for controlling the position of said setpoint generator means, such that the duration of opening of one said throttle valve is set to allow a partial quantity of said heating medium to flow through said partial heat exchanger in dependence on the duration of opening of all other set throttle valves which are simultaneously opened.

2. A regulating device according to claim 1, wherein said control means include means for changing the duration of opening in dependence on at least one of a cabin temperature and an air outlet temperature of said heating system.

3. A regulating device according to claim 2, wherein said control means includes means for changing said duration of opening in dependence on the difference between an actual value and a setpoint of at least one of said cabin temperature and said air outlet temperature.

4. A regulating device according for a multi-channel cycle-controlled heating system of a motor vehicle, said system having a heat exchanger which is divided into partial heat exchangers for heating different cabin areas and is equipped with a common inlet opening for heating medium and with a throttle valve arranged at an outlet opening of each said partial heat exchanger, said regulating device comprising:

setpoint generator means associated with said throttle valves for setting a duration of a cycle period of opening of each said throttle valve according to a position of said setpoint generator means;

wherein said setpoint generator means includes control means for controlling the position of said setpoint generator means such that the duration of opening of one said throttle valve is set to allow a partial quantity of said heating medium to flow through said partial heat exchanger in dependence on the position of all other said setpoint generator means.

* * * * *